H. F. DETERDING.
AUTOMATIC ADJUSTER FOR SEEDING MACHINES.
APPLICATION FILED OCT. 3, 1906. RENEWED OCT. 14, 1907.
912,826.
Patented Feb. 16, 1909.
4 SHEETS—SHEET 1.
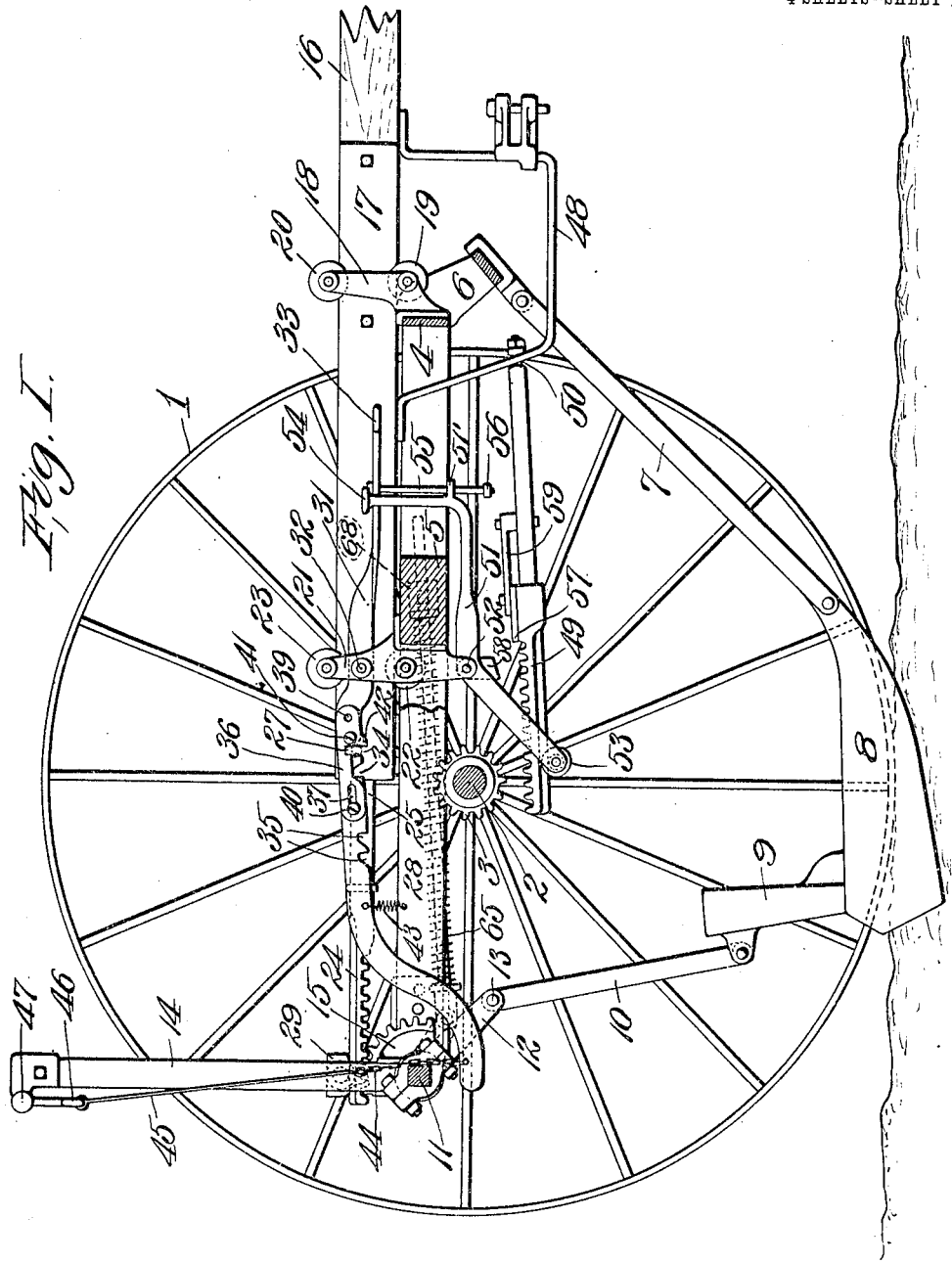

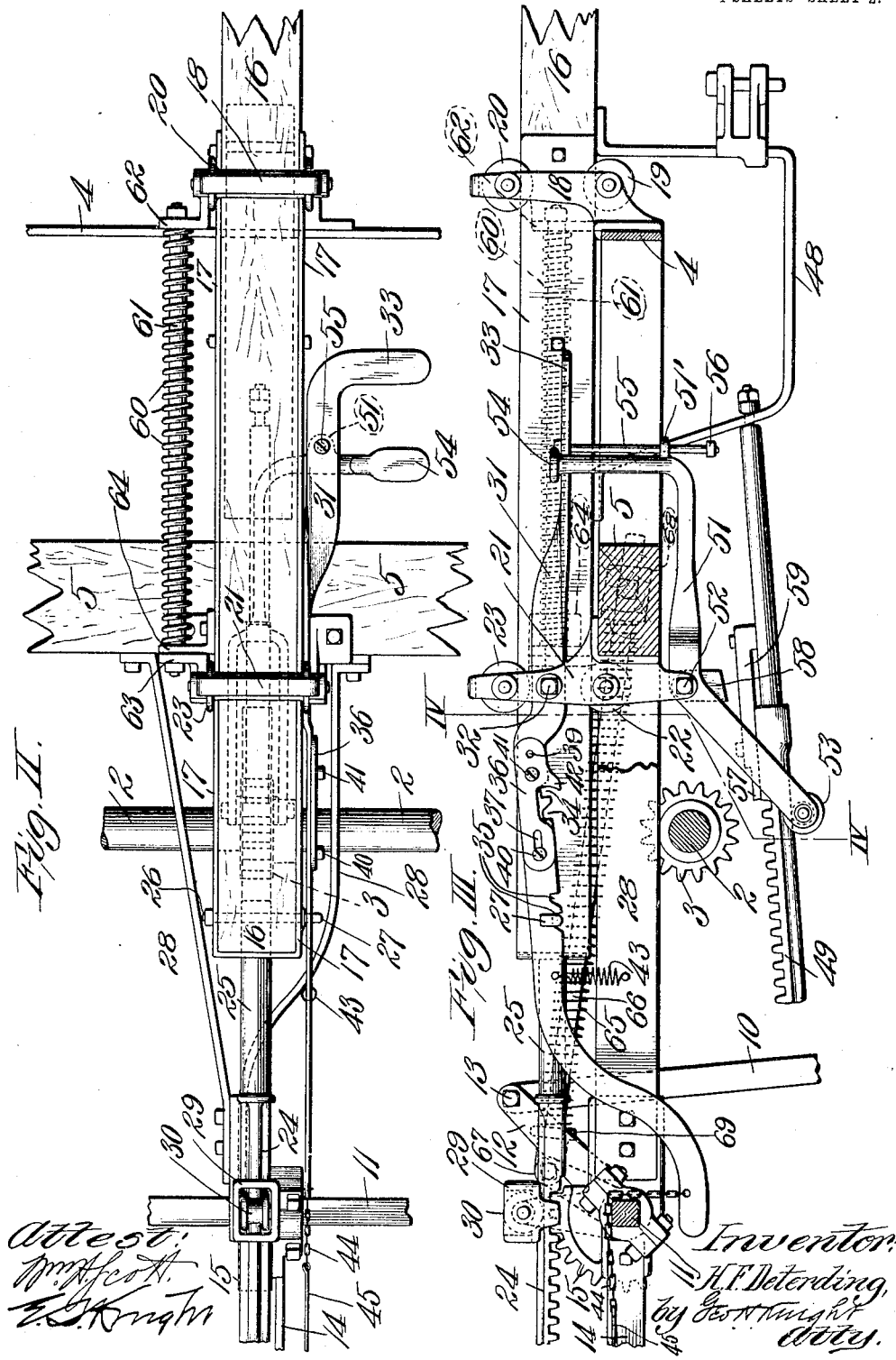

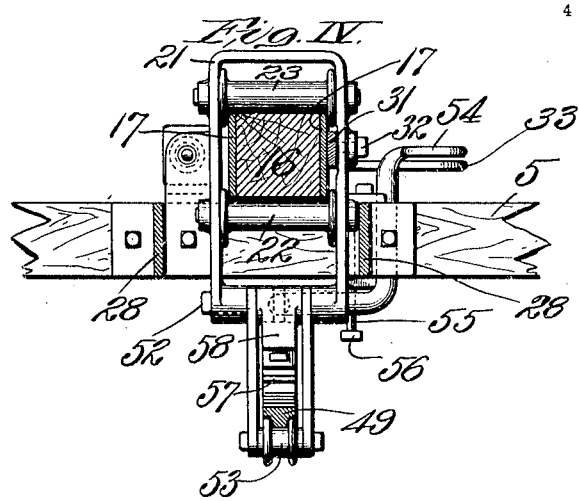
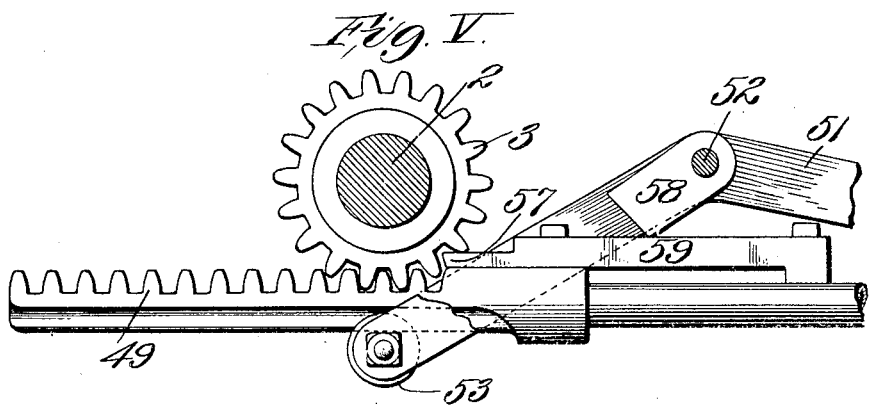
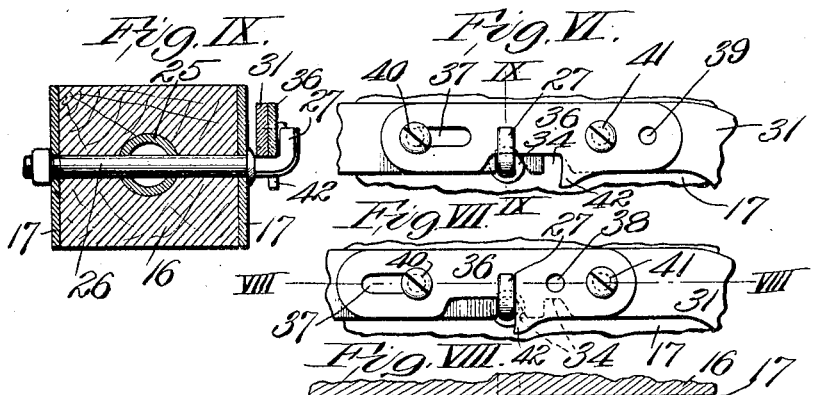

H. F. DETERDING.
AUTOMATIC ADJUSTER FOR SEEDING MACHINES.
APPLICATION FILED OCT. 3, 1906. RENEWED OCT. 14, 1907.
912,826.  Patented Feb. 16, 1909.
4 SHEETS—SHEET 4.
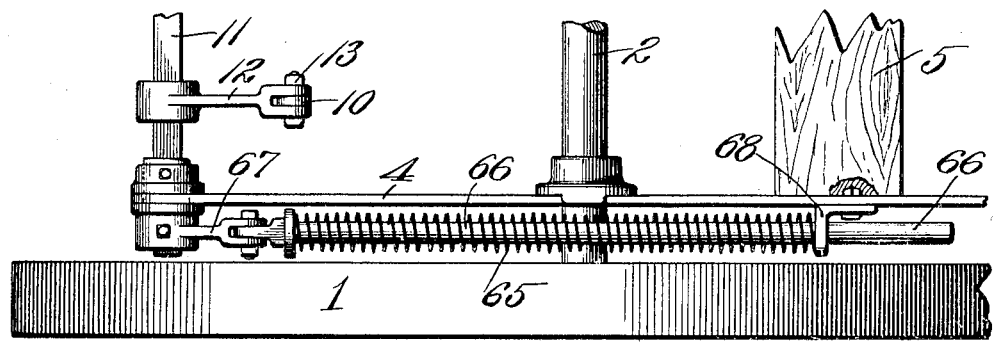
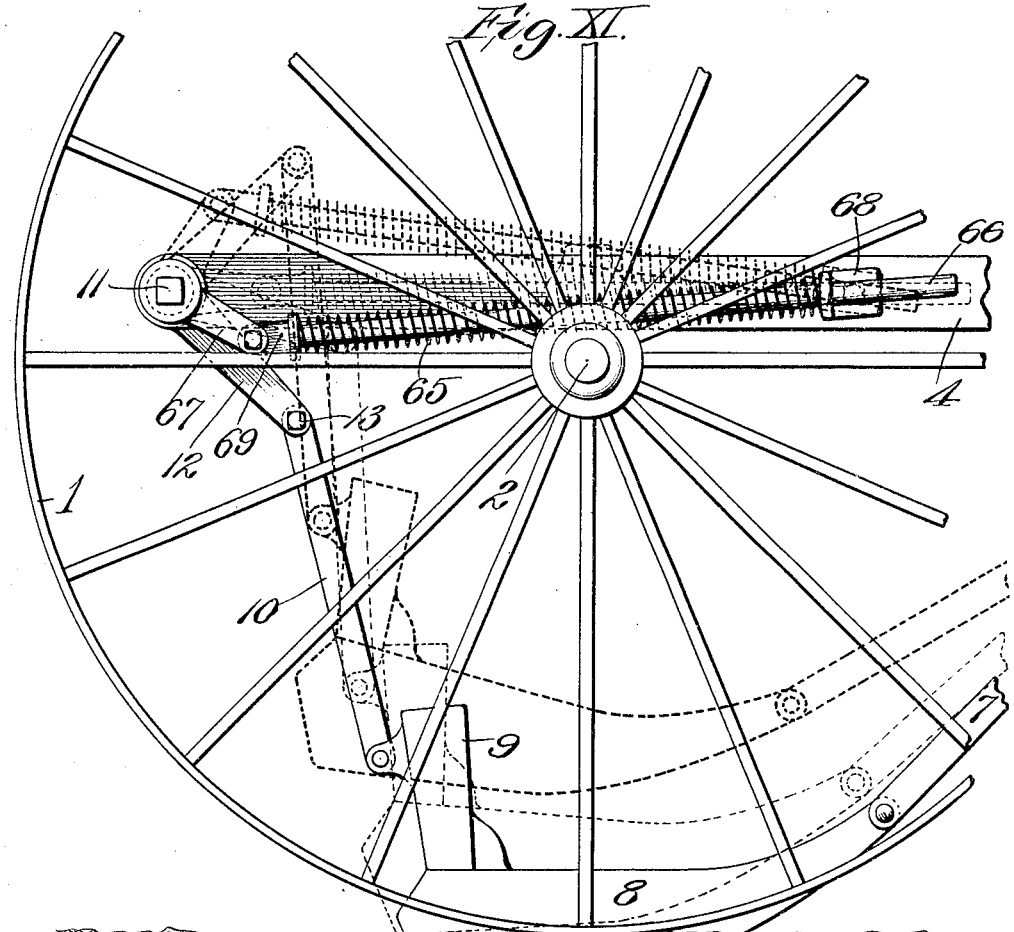

UNITED STATES PATENT OFFICE.

HENRY F. DETERDING, OF ST. LOUIS, MISSOURI.

AUTOMATIC ADJUSTER FOR SEEDING-MACHINES.

No. 912,826.     Specification of Letters Patent.     Patented Feb. 16, 1909.

Application filed October 3, 1906, Serial No. 337,267. Renewed October 14, 1907. Serial No. 397,356.

*To all whom it may concern:*

Be it known that I, HENRY F. DETERDING, a citizen of the United States of America, residing at the city of St. Louis, in the State of Missouri, have invented certain new and useful Improvements in Automatic Adjusters for Seeding-Machines, of which the following is a full, clear, and exact description, reference being had to the accompanying drawings, forming part of this specification.

My invention relates to means for adjusting the furrow openers of seeding machines in an automatic manner, the parts being so constructed that the furrow openers are raised and lowered through the medium of the tongue of the machine when acted upon by the draft of the animals employed in pulling the machine.
The construction also includes means by which the furrow openers may be manually raised and lowered.

The invention has for its object to provide a construction that will make it possible for the driver or operator of a seeding machine to control the furrow openers without arduous labor and permit him to give his undivided attention to the draft animals in order that satisfactory seeding operation may be carried out.

Features of construction shown and described in this application are claimed in co-pending application Serial Number 388,110, filed August 12, 1907.
Figure I is a view partly in longitudinal section and partly in elevation of my furrow opener adjusting mechanism. Fig. II is an enlarged top or plan view of the adjusting mechanism with the draft tongue illustrated in a position retracted from that illustrated in Fig. I. Fig. III is an enlarged side elevation of the parts shown in Fig. II and in corresponding positions. Fig. IV is an enlarged vertical cross section taken on line IV—IV, Fig. III. Fig. V is an enlarged side elevation of the parts by which the draft tongue is shifted in elevating the furrow openers from the ground. Fig. VI is an enlarged side elevation of a portion of the draft tongue controlling lever and the guard plate carried thereby. Fig. VII is a similar view to Fig. VI, with the guard plate shown in a varied position. Fig. VIII is a longitudinal horizontal section taken on line VIII—VIII, Fig. VII. Fig. IX is an enlarged vertical cross section taken on line IX—IX, Fig. VI, through the draft tongue, the tongue controlling lever and the guard plate carried by said lever. Fig. X is a top or plan view of one side of my machine at the location of the spring mechanism that acts in conjunction with the furrow openers. Fig. XI is a side elevation of the parts shown in Fig. X.
1 designates one of the ground wheels of a seeding machine and 2 is an axle rigidly mounted in said ground wheel.

3 is a gear wheel fixed to the axle 2 between the ground wheels of the machine.
The axle 2 supports a main frame that includes a forward cross bar 4 and a cross piece 5, the latter of which is located rearwardly from the former.

6 designates a hanger carried by the frame cross bar 4 and to which is connected a draw-rod 7 that in turn has connected to it a furrow opening shoe 8. The furrow opening shoe carries a seed chute 9 into which the seed may be dropped from any ordinary seed box supported by the frame of the machine to be deposited in the ground at the rear in a furrow that is opened by the shoe 8.

10 is a lift link having its lower end pivotally connected to the seed chute 9.

11 designates a rock shaft that is journaled in the rear portion of the frame of the machine and to which is fixed a crank arm 12 that is pivotally connected at 13 to the lift link 10. 14 is a hand lever also fixed to the rock shaft 11 and by which said rock shaft may be rocked for the purpose of raising and lowering the furrow opening shoe relative to the ground.

15 is a toothed segment fixed to the rock shaft 11 and to which more particular reference will hereinafter be made.

16 designates a draft tongue the rear end of which is slidably positioned above the main frame of the machine, the tongue being preferably provided at its sides with wear plates 17.

18 is a forward bracket attached to the frame cross-bar 4 and in which are journaled a lower anti-friction roller 19 and an upper anti-friction roller 20, preferably flanged at their ends and between which the draft tongue is adapted to operate when it is shifted forwardly or rearwardly relative to the main frame of the machine or said main frame is shifted forwardly or rearwardly relative to said tongue.

21 is a bracket supported by the frame cross piece 5 and in which are journaled a lower anti-friction roller 22 and an upper anti-friction roller 23, preferably flanged and between which the draft tongue operates for utility similar to that of the rollers 19 and 20. The rollers 22 and 23 serve as bearing members for the draft tongue to facilitate its forward and backward movement and by providing flanges upon said rollers they are caused to direct the movement of the tongue and insure its movement in a straight line.

24 designates a rack bar that is secured to the draft tongue 16 at its rear end and extends longitudinally of the tongue, the method of securing the bar to the tongue being preferably that illustrated in Fig. IX, in which the rack bar is provided with a shank 25 that extends into the tongue.

26 is a rod or bolt extending transversely through the draft tongue the wear plates 17 and the shank of the rack bar and provided at one end with a hook or finger 27 that has utility to be hereinafter specified. It will be seen that by this construction, the wear plates are caused to take the strain imposed upon the tongue by the rack bar 24.

The teeth of the rack bar 24 are arranged in engagement with the teeth of the segment 15 hereinbefore mentioned, in order that said segment and the rock shaft 11 by which it is carried may be rocked when the draft tongue 16 is shifted in a forward or rearward direction, for the purpose of lowering the furrow opener to and into the ground or lifting it from the ground.

The rock shaft 11 is supported by any suitable means, such as arms 28 that extend rearwardly from the frame cross piece 5. 29 is a bracket supported by one of these arms and located adjacent to the rack bar 24. In this bracket is journaled a grooved anti-friction roller 30 beneath and in engagement with which the rack bar 24 rides to be held in mesh with the toothed segment 15 as seen most clearly in Figs. II and III. The roller 30 being grooved serves as a bearing member for the rack bar 24 and also to prevent lateral movement of said rack bar in order that it will be constantly maintained in engagement with the toothed segment 15.

For the purpose of controlling the draft tongue I utilize a latch lever 31 that is pivotally connected with the frame of the machine by a pivot-pin 32 seated in the roller supporting bracket 21. This latch lever is fulcrumed intermediate of its ends and its forward arm is provided with a foot piece 33. The rear arm of the latch lever is provided with a forward set of notches 34 and a rear notch or notches 35 that are spaced apart from each other and each of which is adapted to receive the hook or finger 27 carried by the draft tongue and through the medium of which the draft tongue is held from movement. The forward notches 34 are designed to receive said finger or hook when the draft tongue is in its forward position and the furrow opener has been lowered to the ground and the notch or notches 35 receive said finger or hook when the furrow opener has been lifted from the ground by a rearward motion of the draft tongue and the consequent lifting action of the furrow opener by the rack bar 24 and the segment 15 carried by the rock shaft 11, through the medium of which the furrow opener is operated.

36 is a controlling plate shiftably attached to the latch lever 31 and by which the forward one of the notches 34 may be covered when it is desired to have the hook or finger 27 enter the rearmost latch lever notch 34 with the object of causing the furrow opener to descend to a less depth into the ground when in lowered position. This controlling plate is provided with a longitudinal slot 37 that receives a screw or pin 40 seated in the latch lever and it is also provided with two screw or pin holes 38 and 39 (see Figs. I, and VI to VIII inclusive). These screw or pin holes 38 and 39 are adapted to receive a screw or pin 41 that seats in an opening in the latch lever 31 and serves to hold the controlling plate from movement when it is in position to leave the forward notch 34 in the latch lever open to receive the hook or finger 27 carried by the draft tongue or hold the plate in position to cover said forward notch and provide for the entrance of the pin or hook into the rearmost notch 34. The controlling plate is provided with a hook 42 against which the hook or pin 27 bears when it is in either of the notches 34, according to the adjustment of said plate. In Fig. I the hook or pin 27 is shown in the forward notch 34 and in Figs. VII and VIII it is shown in the rearmost notch 34 of the latch lever.

43 is a spring that connects the rear arm of the latch lever 31 to a fixed part of the seeding machine, for instance, to one of the rock shaft supporting arms 28 (see Figs. I to III inclusive) and by which the rear arm of the latch lever is normally held in lowered position and returned positively to such position after it has been actuated to free the draft tongue 16.

44 is a chain having one end connected to the rear arm of the latch lever 31 and the other end connected to a pull rod 45, that is joined to a grip lever 46 that is loosely connected to the hand lever 14 and is arranged adjacent to a handle 47 carried by said hand lever, whereby a pull may be effected upon the latch lever 31 for the purpose of elevating the rear arm thereof and disconnecting it from the draft tongue 16 in order that said tongue may be shifted either forwardly or rearwardly for the purpose of lowering the furrow opener to the ground or elevating it therefrom. The hand lever 14 and the parts by which connection is made therefrom to the latch lever are intended to be used only when the operator of the machine is walking.

48 designates a hanger that is attached to the draft tongue 16 and to which the draft animals are preferably hitched.

49 designates a rack bar, the forward end of which is connected at 50 to the hanger 48 and the toothed portion of which occupies a position beneath the axle 2 of the seeding machine and adapted to be brought into mesh with the gear wheel 3 fixed to said axle, for the purpose of causing a rearward movement to be imparted to the draft tongue 16 and the furrow opener to be elevated through the medium of the rack bar 24 and the toothed segment 15 and rock shaft 11 by which the furrow opener is actuated. The rack bar 49 is raised to the gear wheel 3 by a lift lever 51 that is pivoted to a fixed part of the frame of the machine, for instance, the bracket 21 to which said lever is shown pivoted at 52 (see Figs. I and III). The rear arm of said lift lever carries a grooved anti-friction roller 53 on which the rear portion of the rack bar 49 rests and is guided in a straight line and the forward arm of the lift lever is provided with a foot piece 54, preferably located in proximity to the foot piece 33 of the latch lever 31. The roller 53, being grooved, embraces the sides of the rack bar 49 and prevents lateral movement thereof so that the bar is always maintained in a position beneath the gear wheel 3 ready to be elevated into mesh therewith.

55 is a pull rod attached to and depending from the latch lever 31 and provided at its lower end with a knob 56.

51' is a trigger finger carried by the trip lever 51 and arranged to engage the knob 56 of the pull rod 55 when the trip lever is depressed to raise the rack bar 49 to the gear wheel 3 on the axle 2.

For the purpose of causing the rack bar 49 to be thrown to a lowered position after it has served the office of moving the draft tongue rearwardly to elevate the furrow opener, I provide upon said rack bar adjacent to the foremost tooth thereof, a shoulder 57 that is adapted to be engaged by an approaching tooth of the axle carried gear wheel 3 which will serve to depress the rack bar. To provide for the retention of the rack bar 49 in a lowered position after it has been actuated to move the draft tongue rearwardly, I mount upon the pivot of the lift lever 51 a swinging dog 58 (see Figs. I, III and V), and provide upon the rack bar member a ledge 59 by which the shoulder 57 is preferably carried and onto which said dog 58 is adapted to ride. While the rack bar 49 is performing its office of moving the draft tongue the dog 58 is moved from the vertical position illustrated in Figs. I and III by the ledge 59 into the inclined position seen in Fig. V, so that it will rest without action upon the rack bar until said rack bar has completed its movement and is lowered due to the engagement of the gear wheel 3 with the shoulder 57. Immediately after said rack bar being lowered the dog falls into a vertical position and serves to restrain the rack bar against upward movement, even though the lift lever 51 be brought into action against it, thereby preventing any part of the rack bar being raised to the gear wheel to wear thereagainst and necessitate a forward movement of the rack bar with the draft tongue previous to its elevation to the gear wheel for a tongue moving action in a manner previously described.

60 designates an expansible retracting spring that surrounds a rod 61 which is mounted in a bracket arm 62 carried by the draft tongue guiding bracket 18 and a bracket arm 63 carried by the draft tongue guiding bracket 21.

64 is a bracket carried by the draft tongue and loosely fitted to the rod 61 and against which the rear end of the retracting spring 60 bears. The retracting spring is adapted to be compressed when the draft tongue is drawn forwardly to lower the furrow opener to the ground and it remains under tension while the furrow opener is operating in the ground. When, however, the furrow opener is to be elevated by the rearward movement of the draft tongue and the actuation of the rock shaft 11 through the medium of the rack bar 24, the retracting spring assists in the operation of the tongue and the lifting of the furrow opener.

65 (see Figs. I, III, X and XI) designates a lift spring that assists in elevating the furrow opener. This lift spring is positioned upon a push rod 66 that is loosely connected at its rear end to a crank arm 67, fixed to the rock shaft 11 and a rockable bracket 68 attached to a fixed part of the machine, the spring 65 being located between said bracket and a shoulder 69 on the push rod. When the furrow opener is lifted out of the ground to the position indicated by light dotted lines in Fig. XI, through the medium of the draft tongue and the furrow opener lifting parts associated therewith assisted by the retracting spring 60, the push rod 66 and the lift spring thereon occupy the horizontal position illustrated in light dotted lines Fig. XI. Immediately thereafter as the draft tongue continues to move rearwardly, assisted by the retracting spring, the lift spring 65 is brought into action and exerts an upward pressure against the crank arm 67 to which it is connected with the result that the furrow opener, push rod and crank arm 67 are quickly and efficiently elevated to the uplifted positions seen in heavy dotted lines Fig. XI.

When my furrow opener adjusting mechanism is in use upon a seeding machine and a driver is operating the machine while seated thereon, he controls the furrow opener lifting mechanism in the following manner: It being assumed that the furrow opener is in elevated position and the latch lever being in engagement with the hook or finger 27 due to the seating of said hook or finger in one of the rear notches 35 in said latch lever, as seen in Fig. III, and the furrow opener being in elevated position, the driver for the purpose of lowering the furrow opener first places his foot on the foot piece 33 of the latch lever 31 and by pressing the forward arm of said latch lever causes the rear arm of the latch lever to be lifted with the result of withdrawing the latch lever from the finger or hook 27 of the draft tongue so that said hook or finger is freed from a notch 35 in said latch lever. The draft tongue is thereby freed from restraint and upon the draft animals hitched to the tongue exerting a forward pull thereon the rack bar 24 is caused to coöperate with the segment 15 whereby the rock shaft 11 is rotated and the furrow opener is lowered to and into the ground. The furrow opener being now in position for planting operation planting action is continued until it is desired to elevate the furrow opener, which is accomplished when the driver places his foot upon the foot piece of the lift lever 51 and in the following manner: As the forward arm of said lift lever is lowered the rear arm of the lift lever acts to elevate the rack bar 49, which is at this time in the position seen in Fig. I, the rear end of the rack bar being located beneath the axle and the gear wheel 3. Just before the teeth of the rack bar 49 enter into engagement with the teeth of the gear wheel 3 the trigger finger 51' carried by the lift lever 51 strikes against the knob 56 carried by the pull rod 55 and as a consequence the latch lever is tilted in a manner to remove it from engagement with the hook or finger 27 which was previously seated in one of the notches 34 in said latch lever and the draft tongue is thereby freed as a precedent to the engagement of the rack bar 49 with the gear wheel 3. When the engagement of the last mentioned parts occurs the gear wheel 3 by operation upon the rack bar 49, due to its rotation with the axle 2 causes the rack bar to be moved rearwardly and move the draft tongue therewith in a corresponding direction. During this action the furrow opener is elevated through the medium of the rack bar 24, segment 15, rock shaft 11 and other coöperating parts previously described, and when the elevation of the furrow opener is completed the hook or finger 27 carried by the draft tongue enters into one of the rearmost notches 35 in the latch bar with the result of holding the parts in fixed positions until the latch bar is again operated. When the driver is walking he may readily release the latch bar 31 from the draft tongue by operating the grip handle 46 and the hand lever 14, whereby when the draft animals exert a forward pull upon the tongue the furrow opener operating parts will cause the furrow opener to be lowered to the ground. To elevate the furrow opener from the ground the driver may grasp the handle of the hand lever 14 and pull said lever rearwardly while at the same time operating the grip handle 46 to release the latch bar 31 from the draft tongue and the rock shaft 11 is rocked in a direction to lift the furrow opener. As soon as the draft tongue is released by the withdrawal of the latch bar from engagement therewith, the tongue retracting spring 60 becomes operative to move the draft tongue in a rearward direction, with a result that the rack bar 24 by coöperation with the toothed segment 15 serves to assist in the movement of the rock shaft and to lift the furrow opener. The spring 60 is of greater power than the lift spring 65 and consequently overcomes any resistance offered by said lift spring during the movement of said lift spring and the rod on which it is mounted to a horizontal position and after the lift spring reaches and passes the horizontal position it acts as an assistance member in completing the elevation of the furrow opener.

I claim:—

1. In an adjuster of the character described, the combination of a supporting frame, a furrow opener, a draft tongue movable relative to said frame, means actuated by said tongue for raising said furrow opener, and a lift spring coöperating with said opener raising means substantially as set forth.

2. In an adjuster of the character described, the combination of a supporting frame, a furrow opener, a draft tongue movable relative to said frame, a gear member with which said furrow opener has connection, a gear member carried by said tongue and coöperating with said first named gear member, whereby said furrow opener is moved relative to said frame upon the movement of said tongue, and a lift spring coöperating with said furrow opener raising means substantially as set forth.

3. In an adjuster of the character described, the combination of a supporting frame, a furrow opener movably connected to said frame, a draft tongue movable relative to said frame, means associated with said furrow opener and draft tongue whereby said furrow opener is moved relative to said frame, a lift spring coöperating with said furrow opener raising means and a latch lever for holding said tongue in a fixed position after it has been shifted, substantially as set forth.

4. In an adjuster of the character described, the combination of a supporting frame, a furrow opener movably connected to said frame, a rock shaft to which said furrow opener is connected, a gear member carried by said rock shaft, a draft tongue movable relative to said frame, and a gear member carried by said draft tongue and engaging said rock shaft carried gear member, substantially as set forth.

5. In an adjuster of the character described, the combination of a supporting frame, a furrow opener movably connected to said frame, a rock shaft to which said furrow opener is connected, a gear member carried by said rock shaft, a draft tongue movable relative to said frame, a gear member carried by said draft tongue and engaging said rock shaft carried gear member, and means for holding said tongue in a fixed position after it has been shifted, substantially as set forth.

6. In an adjuster of the character described, the combination of a supporting frame, a furrow opener movably connected to said frame, a rock shaft to which said furrow opener is connected, a gear member carried by said rock shaft, a draft tongue movable relative to said frame, a gear member carried by said draft tongue and engaging said rock shaft carried gear member, and a latch lever for holding said tongue in a fixed position after it has been shifted, substantially as set forth.

7. In an adjuster of the character described, the combination of a supporting frame, a furrow opener movably connected to said frame, a rock shaft to which said furrow opener is connected, a toothed segment carried by said rock shaft, a draft tongue movable relative to said frame, and a rack bar carried by said tongue and engaging said segment, substantially as described.

8. In an adjuster of the character described, the combination of a supporting frame, a furrow opener movably connected to said frame, a rock shaft to which said furrow opener is connected, a toothed segment carried by said rock shaft, a draft tongue movable relative to said frame, a rack bar carried by said tongue and engaging said segment, and means for holding said tongue in a fixed position after it has been shifted, substantially as set forth.

9. In an adjuster of the character described, the combination of a supporting frame, a furrow opener movably connected to said frame, a rock shaft to which said furrow opener is connected, a toothed segment carried by said rock shaft, a draft tongue movable relative to said frame, a rack bar carried by said tongue and engaging said segment, and a latch lever for holding said tongue in a fixed position after it has been shifted, substantially as set forth.

10. In an adjuster of the character described, the combination of a supporting frame, a furrow opener movably connected to said frame, a draft tongue movable relative to said frame, a gear member having connection with said furrow opener, a gear member carried by said draft tongue and engaging said first named gear member, and a notched latch lever connected to said frame and arranged for engagement with said tongue, substantially as set forth.

11. In an adjuster of the character described, the combination of a supporting frame, a furrow opener movably connected to said frame, a draft tongue movable relative to said frame, a gear member having connection with said furrow opener, a gear member carried by said tongue and engaging said first named gear member, a latch lever connected to said frame, and a finger carried by said tongue and with which said lever is adapted to engage, substantially as set forth.

12. In an adjuster of the character described, the combination of a supporting frame, a furrow opener movably connected to said frame, a draft tongue movable relative to said frame, a gear member having connection with said furrow opener, a gear member carried by said tongue and engaging said first named gear member, a latch lever connected to said frame, a finger carried by said tongue and with which said lever is adapted to engage, and a controlling plate shiftably connected to said lever, substantially as set forth.

13. In an adjuster of the character described, the combination of a supporting frame, a furrow opener movably connected to said frame, a draft tongue movable relative to said frame, a gear member having connection with said furrow opener, a gear member carried by said tongue and coöperating with said first named gear member, a latch lever for controlling said tongue, a hand lever associated with said first named gear member, and operating means connecting said latch lever to said hand lever, substantially as set forth.

14. In an adjuster of the character described, the combination of a supporting frame, a furrow opener movably connected to said frame, a rock shaft having connection with said furrow opener, a gear member carried by said rock shaft, a draft tongue movable relative to said frame, a gear member carried by said tongue and coöperating with said rock shaft carried gear member, a latch lever for controlling said tongue, a hand lever fixed to said rock shaft, and operating means carried by said hand lever and connected to said latch lever, substantially as set forth.

15. In an adjuster of the character described, the combination of a supporting frame, ground wheels and axle by which said frame is supported, a gear member carried by said axle, a furrow opener movably connected to said frame, a draft tongue movable relative to said frame, means whereby said draft tongue is geared to said furrow opener, and means carried by said draft tongue and arranged to be thrown into engagement with said axle carried gear member, substantially as set forth.

16. In an adjuster of the character described, the combination of a supporting frame, ground wheels and axle by which said frame is supported, a gear member carried by said axle, a furrow opener movably connected to said frame, a draft tongue movable relative to said frame, means whereby said draft tongue is geared to said furrow opener, means carried by said draft tongue and arranged to be thrown into engagement with said axle carried gear member, and means for moving said tongue carried gear member to said axle carried gear member, substantially as set forth.

17. In an adjuster of the character described, the combination of a supporting frame, ground wheels and axle by which said frame is supported, a gear member carried by said axle, a furrow opener movably connected to said frame, a draft tongue movable relative to said frame, means whereby said draft tongue is geared to said furrow opener, means carried by said draft tongue and arranged to be thrown into engagement with said axle carried gear member, and a lift lever connected to said frame and arranged to move said tongue carried gear member to said axle carried gear member, substantially as set forth.

18. In an adjuster of the character described, the combination of a supporting frame, ground wheels and axle by which said frame is supported, a pinion carried by said axle, a furrow opener movably connected to said frame, a draft tongue movable relative to said frame, means whereby said draft tongue is geared to said furrow opener, a rack bar connected to said tongue and arranged to engage said pinion, and a lift lever connected to said tongue for moving said rack bar to said pinion, substantially as set forth.

19. In an adjuster of the character described, the combination of a supporting frame, ground wheels and axle by which said frame is supported, a pinion carried by said axle, a furrow opener movably connected to said frame, a draft tongue movable relative to said frame, means whereby said draft tongue is carried to said furrow opener, a rack bar connected to said tongue and arranged to engage said pinion, a lift lever connected with said tongue for moving said rack bar to said pinion, a latch lever for engagement with said tongue to hold it in a fixed position, and means of connection between said lift lever and latch lever, substantially as set forth.

20. In an adjuster of the character described, the combination of a supporting frame, ground wheels and axle by which said frame is supported, a gear member carried by said axle, a furrow opener movably connected to said frame a draft tongue movable relative to said frame, means whereby said draft tongue is geared to said furrow opener, means carried by said draft tongue and arranged to be thrown into engagement with said axle carried gear member, a lift lever connected to said frame and arranged to move said tongue carried gear member to said axle carried gear member, and a dog associated with said lift lever and arranged for engagement with said tongue carried gear member, substantially as and for the purpose set forth.

21. In an adjuster of the character described, the combination of a supporting frame, a furrow opener, a draft tongue movable relative to said frame, means whereby said draft tongue is geared to said furrow opener, and a retracting spring for imparting movement to said tongue after it has been moved forwardly, substantially as set forth.

22. In an adjuster of the character described, the combination of a supporting frame, a furrow opener movably connected to said frame, a rock shaft supported by said frame and having connection with said furrow opener, a draft tongue movable relative to said frame and geared to said rock shaft, and a lift spring coöperating with said rock shaft, substantially as set forth.

23. In an adjuster of the character described, the combination of a supporting frame, a furrow opener movably connected to said frame, a rock shaft supported by said frame and having connection with said furrow opener, a draft tongue movable relative to said frame and geared to said rock shaft, a crank arm fixed to said rock shaft, a push rod supported by said frame and connected to said crank arm, and a lift spring mounted on said push rod and arranged to exert power upon said crank arm for the purpose of moving said furrow opener, substantially as set forth.

24. In an adjuster of the character described, the combination of a supporting frame, a furrow opener movably connected to said frame, a rock shaft to which said furrow opener is connected, a toothed segment carried by said rock shaft, and a rack bar carried by said tongue and engaging said segment, and a grooved anti-friction roller supported by said frame and bearing against said rack bar to maintain it in engagement with said segment, substantially as set forth.

25. In an adjuster of the character described, the combination of a supporting frame, ground wheels and axle by which said frame is supported, a pinion carried by said axle, a furrow opener movably connected to said frame, a draft tongue movable relative to said frame, and having connection with said furrow opener, a rack bar connected to said tongue and arranged to be moved into engagement with said pinion, a lift lever connected to said tongue and adapted to move said rack bar to said pinion, and a grooved roller carried by said lift lever and on which said rack bar rests, substantially as set forth.

26. The combination with a seeding machine including a frame and a furrow opener, of a rockably mounted ratchet rack supported by said frame and having connection with said furrow opener, and a draft tongue movably supported by said frame and having connection with said ratchet rack, substantially as set forth.

27. The combination with a seeding machine including a frame and a furrow opener, of a rockably mounted ratchet rack supported by said frame and having connection with said furrow opener, and a draft tongue movably supported by said frame and having connection with said ratchet rack, and means for holding said ratchet rack from movement after it has been shifted to move said furrow opener, substantially as set forth.

28. The combination with a seeding machine including a frame and a furrow opener, of a rockably mounted ratchet rack supported by said frame and having connection with said furrow opener, and a draft tongue movably supported by said frame and having connection with said ratchet rack, and means for holding said ratchet rack from movement after it has been shifted to move said furrow opener, and lever mechanism for releasing said rack holding means, substantially as set forth.

29. The combination with a seeding machine including a frame and a furrow opener, of a draft tongue movably supported by said frame and having connection with said furrow opener whereby the furrow opener is moved vertically upon the forward and rearward movements of the tongue, and a spring coöperable with said tongue, substantially as set forth.

30. The combination with a seeding machine including a frame and a furrow opener, of a rockable ratchet rack having connection with said furrow opener and supported by said frame and a draft tongue having connection with said ratchet rack whereby the ratchet rack is moved when the tongue is moved longitudinally, and a spring having connection with said ratchet rack to impart movement thereto, substantially as set forth.

31. The combination with a seeding machine including a frame and a furrow opener, of a ratchet rack rockably supported by said frame and having connection with said furrow opener, a draft tongue movably supported by said frame and having connection with said rock shaft whereby the furrow opener may be raised and lowered, and a hand lever carried by said ratchet rack for imparting movement thereto to raise and lower said furrow opener, substantially as set forth.

HENRY F. DETERDING.

In presence of—
NELLIE V. ALEXANDER,
BLANCHE HOGAN.